US009767611B2

(12) United States Patent
Takemoto

(10) Patent No.: US 9,767,611 B2
(45) Date of Patent: Sep. 19, 2017

(54) INFORMATION PROCESSING APPARATUS AND METHOD FOR ESTIMATING DEPTH VALUES USING AN APPROXIMATE PLANE

(71) Applicant: CANON KABUSHIKI KAISHA, Tokyo (JP)

(72) Inventor: Kazuki Takemoto, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 144 days.

(21) Appl. No.: 14/521,344

(22) Filed: Oct. 22, 2014

(65) Prior Publication Data
US 2015/0116315 A1   Apr. 30, 2015

(30) Foreign Application Priority Data

Oct. 24, 2013   (JP) .................................. 2013-221091

(51) Int. Cl.
| | | |
|---|---|---|
| G06T 19/00 | (2011.01) | |
| G06T 7/00 | (2017.01) | |
| G06T 15/00 | (2011.01) | |
| G06T 7/564 | (2017.01) | |

(52) U.S. Cl.
CPC ............ G06T 19/006 (2013.01); G06T 7/564 (2017.01); G06T 15/00 (2013.01); *G06T 2207/10012* (2013.01)

(58) Field of Classification Search
CPC ... G06T 7/0097; G06T 7/0075; G06T 19/006; G06K 9/00221–9/00315; G01C 11/00–11/34
See application file for complete search history.

(56) References Cited

U.S. PATENT DOCUMENTS

| | | | | |
|---|---|---|---|---|
| 5,671,157 A | * | 9/1997 | Saito ....................... | G06T 19/00 345/419 |
| 2008/0292180 A1 | * | 11/2008 | Kobayashi ............. | G06K 9/209 382/154 |
| 2011/0038510 A1 | * | 2/2011 | Nakamura ......... | G06K 9/00201 382/106 |

(Continued)

OTHER PUBLICATIONS

Christiansen, Henry N., and Thomas W. Sederberg. "Conversion of complex contour line definitions into polygonal element mosaics." ACM Siggraph Computer Graphics. vol. 12. No. 3. ACM, 1978.*

(Continued)

*Primary Examiner* — Daniel Hajnik
(74) *Attorney, Agent, or Firm* — Canon U.S.A., Inc. IP Division

(57) ABSTRACT

An information processing apparatus extracts, from each of images of an object captured from a plurality of viewpoints, a contour of the object, selects at least one point included in the contour for each of the extracted contour, and associates the selected points between the images, derives three-dimensional coordinates of the associated points, derives a plane for approximating the object based on the derived three-dimensional coordinates of the points, and estimates depth values of unassociated points out of points on the contour based on the three-dimensional coordinates of the related points and the derived plane, to accurately estimate depth value of the object.

12 Claims, 16 Drawing Sheets

(56) References Cited

U.S. PATENT DOCUMENTS

| | | | |
|---|---|---|---|
| 2012/0002841 A1* | 1/2012 | Aratani | G06T 7/0075 |
| | | | 382/103 |
| 2012/0086724 A1* | 4/2012 | Bellamy | G06T 19/20 |
| | | | 345/629 |
| 2013/0163883 A1 | 6/2013 | Takemoto | |
| 2013/0182902 A1* | 7/2013 | Holz | G06K 9/3233 |
| | | | 382/103 |

OTHER PUBLICATIONS

Hayashi et al., "Depth Determination of Real Objects using Contour Based Stereo Matching", Journal of the Virtual Reality Society of Japan, (2005), pp. 371-380, vol. 10 No. 3.

Hayashi et al., "Occlusion Detection of Real Objects using Contour Based Stereo Matching", ICAT '05, pp. 180-186.

Li et al., "Resolving Occlusion Between Virtual and Real Scenes for Augmented Reality Applications", pp. 634-642, 2007.

* cited by examiner

INFORMATION PROCESSING APPARATUS AND METHOD FOR ESTIMATING DEPTH VALUES USING AN APPROXIMATE PLANE

BACKGROUND OF THE INVENTION

Field of the Invention

The present invention relates to an information processing apparatus and a method for controlling the information processing apparatus.

Description of the Related Art

The mixed reality (MR) technology for seamlessly mixing the virtual space made by a computer with the real space has attracted attention in recent years.

The MR technology is expected to be applied to diverse fields, for example, assembly support where assembly procedures and wiring conditions are displayed in superimposed manner at an assembly work, and surgery support where inside conditions of a patient's body are displayed on the patient's body surface in superimposed manner.

It is necessary to correctly express the anteroposterior relation between real and virtual objects to allow a user to feel that a virtual object really exists in the real space without a feeling of strangeness. This issue is also referred to as "occlusion problem". In particular, the occlusion problem is crucial also for a video see-through type MR system in which a virtual object is superimposed on an image captured by a camera.

In order to correctly express the anteroposterior relation between real and virtual objects, three-dimensional position information for each of the real and virtual objects is obtained. The obtained three-dimensional position information for the real object and the obtained three-dimensional position information for the virtual object are then compared with each other. When the real object is anterior to the virtual object, a captured image of the real object is displayed on the anterior side. When the virtual object is anterior to the real object, processing for displaying the virtual object on the anterior side is performed. In this processing, since there is a known three-dimensional model for the virtual object, a three-dimensional position of the virtual object to a viewpoint can be calculated. On the other hand, a three-dimensional position of the real object to the viewpoint is unknown only by capturing the image of the real object. It is therefore necessary to obtain a three-dimensional position of the real object.

A technique for measuring a three-dimensional position of a real object will be described below.

A technique discussed in "Hayashi K, Kato H, and Nishida S, Depth Determination of Real Objects using Contour Based Stereo Matching. Journal of the Virtual Reality Society of Japan. 2005; 10(3): 371-380" detects a moving object by using a difference between a background image referred to as a key frame and a current image captured by a camera. Then, matching of points on a contour of the detected moving object is performed. Since the matching is performed only on points on a boundary, high-speed processing is realized.

The following describes a method for measuring a depth of a target object that is discussed in "Hayashi K, Kato H, and Nishida S, Depth Determination of Real Objects using Contour Based Stereo Matching. Journal of the Virtual Reality Society of Japan. 2005; 10(3): 371-380". The method estimates the depth of a target object by the following process.

1. In each of right and left images in which a target object captured by a stereo camera appears, a contour of the target object in each of the right and left images is identified based on a difference from a background image.

2. In the left image, after dividing the contour of a region at equal intervals, a point having a large curvature is calculated. Then, a sampling point is set.

3. An epipolar line corresponding to the sampling point set in the left image is projected to the right image. Then, points at which a distance between the epipolar line and the contour is minimized are set as corresponding points.

4. A depth value of the obtained corresponding points are calculated based image coordinates of the obtained corresponding points on right and left images, and known relative position and orientation information for the stereo camera.

5. A depth value of a line segment on the contour between a plurality of the corresponding points having depth values is calculated by performing linear interpolation on the depth values of the corresponding points at both ends. This processing is performed on the contour in each of the right and left images.

6. When all depth values on the contour have been obtained, horizontal linear interpolation is performed on depth values of the contours at both ends of the region to obtain a depth value of the region inside the contour. This processing is also performed on the contour in each of the right and left images.

However, if both conditions 1 and 2 described below are satisfied, an error arises in the depth value estimated for the target object calculated by the method discussed in "Hayashi K, Kato H, and Nishida S, Depth Determination of Real Objects using Contour Based Stereo Matching. Journal of the Virtual Reality Society of Japan. 2005; 10(3): 371-380".

Condition 1: As illustrated in FIG. 9, a depth direction 901 at a contour portion having a large curvature, such as a fingertip, is close to a visual axis direction 902. More specifically, the fingertip is oriented in the depth direction of a camera 100.

Condition 2: As illustrated in FIG. 8, for example, when there are no corresponding points in a vicinity of a fingertip 801 having a large curvature of the contour, depth values are determined by performing linear interpolation on depth values of corresponding points 802 and 803 at both ends.

A reason why an error arises when both of these two conditions are satisfied will be described below with reference to FIGS. 10 and 12. FIG. 10 is a schematic diagram illustrating a relation between the cameras 100 and 110 and a hand 150 when the above-described conditions 1 and 2 are satisfied at the same time. FIG. 12 is a schematic diagram illustrating the fingertip 801 illustrated in FIG. 10 in an enlarged view.

If linear interpolation is simply performed on the tip portion of the fingertip 801 based on depth values from the cameras 100 and 110, the fingertip portion is provided as a depth value 1001 illustrated in FIG. 10, whereby an error occurs for the fingertip 801. This is because the depth value 1001 of the fingertip 801 is obtained by interpolating the depth values of the corresponding points 802 and 803 at both ends which are on the anterior side of the image capturing device 100. More specifically, since the depth values of the corresponding points 802 and 803 are constantly anterior to the original depth value of the fingertip 801, an error in the result of linear interpolation also constantly occurs to the depth value of the fingertip 801.

As described above, an error arises in the vicinity of the fingertip 801. As a result, for example, at determination of interference between the fingertip 801 and a virtual object, the fingertip 801 may be incorrectly determined to be not in contact with the virtual object although they are actually in contact with each other.

SUMMARY OF THE INVENTION

According to an aspect of the present invention, an information processing apparatus includes an extraction unit configured to, from each of images of an object captured from a plurality of viewpoints, extract a contour of the object, an association unit configured to, for the contour extracted in each of the images, select at least one point included in the contour and associate the selected points between the images, an approximate plane derivation unit configured to derive three-dimensional coordinates of the associated points and derive a plane for approximating the object based on the derived three-dimensional coordinates of the points, and an estimation unit configured to estimate depth values of the points not associated by the association unit out of points on the contour based on the three-dimensional coordinates of the associated points and the derived plane.

According to the present disclosure, a depth value of an object can be accurately estimated.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

A first exemplary embodiment will be described below based on a case where a hand of a subject (object) 150 is captured using image capturing devices 100 and 110 (stereo camera) to estimate a depth value of a region of the hand 150. An image of a computer graphics (CG) model 160 is processed according to an anteroposterior relation between the CG model 160 and the hand 150. The processed image is then combined with a captured real image to display the combined image on a display unit 208. Examples of an image capturing device include, for example, a head-mounted display (HMD) and a handheld display (HHD). However, it is not limited thereto.

Figure 1:
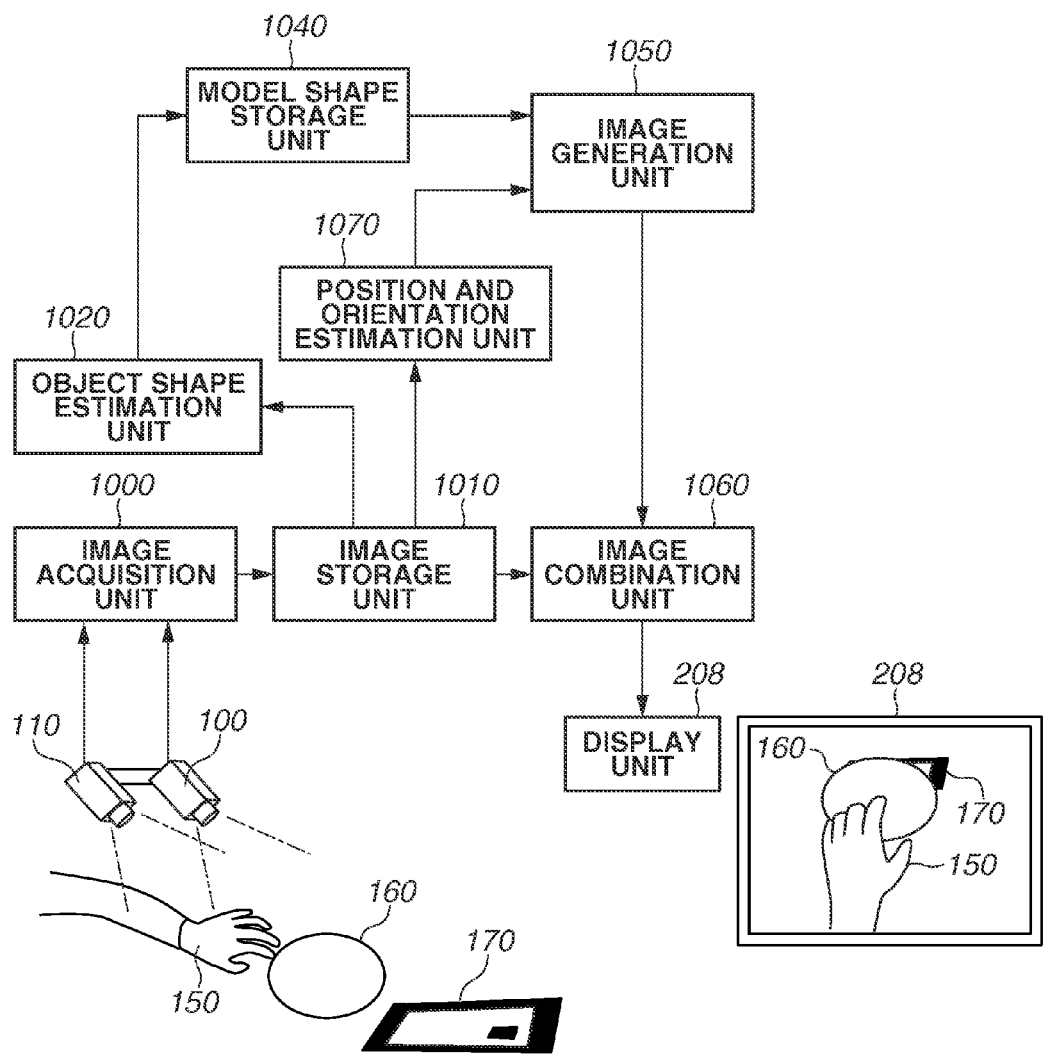
FIG. 1 is a block diagram illustrating an image processing apparatus according to a first exemplary embodiment.

FIG. 1 is a block diagram illustrating a functional configuration of an information processing apparatus according to the present exemplary embodiment.

An image acquisition unit 1000 obtains a plurality of frame images captured by the image capturing devices 100 and 110 according to the present exemplary embodiment. The image capturing devices 100 and 110 are fixed to each other, and capture images. The subject's hand 150 and a marker 170 for measuring position and orientation of the image capturing devices 100 and 110 appear in the images captured by the image capturing devices 100 and 110. The obtained frame images are sequentially stored in an image storage unit 1010. When the image capturing devices 100 and 110 output an analog signal, such as the National Television System Committee (NTSC) signal, the image acquisition unit 1000 is implemented by an analog video capture board. When the image capturing devices 100 and 110 output a digital signal, such as the Institute of Electrical and Electronics Engineers (IEEE) 1394 signal, the image acquisition unit 1000 is implemented, for example, by an IEEE 1394 interface board. The image acquisition unit 1000 may read digital data of a still image and a moving image stored in a storage device in advance.

The image storage unit 1010 stores the image obtained by the image acquisition unit 1000. The image storage unit 1010 is configured by a random access memory (RAM), an external storage device and the like. The image acquisition unit 1000 transmits image data to the image storage unit 1010, for example, in 1/30 seconds.

An object shape estimation unit 1020 obtains a stereo image stored in the image storage unit 1010, and calculates a three-dimensional shape of the hand 150. A method for calculating a three-dimensional shape of the hand 150 will be described below. The object shape estimation unit 1020 outputs the three-dimensional shape of the hand 150 to a model shape storage unit 1040.

The model shape storage unit 1040 stores the three-dimensional model data of the CG model 160, and data of the three-dimensional shape of the hand 150 received from the object shape estimation unit 1020. The model shape storage unit 1040 is configured by a RAM and an external storage device. The model shape storage unit 1040 outputs the stored three-dimensional model data of the CG model 160 and the data of the three-dimensional shape of the hand 150 to an image generation unit 1050.

A position and orientation estimation unit 1070 measures the position and orientation of the image capturing devices 100 and 110. In the present exemplary embodiment, the position and orientation estimation unit 1070 estimates the position and orientation of each of the image capturing devices 100 and 110 based on a projection image of the marker 170 in a shape of square appearing in the captured images. For example, the position and orientation estimation unit 1070 binarizes the image, extracts the corners of a square, repeatedly performs a hill climbing method to minimize a projection error on the image, and estimates the position and orientation of each camera.

The position and orientation of the image capturing devices 100 and 110 may be measured by using other measurement methods, such as a motion capture apparatus and a magnetic sensor.

The image generation unit 1050 generates the image of the CG model 160 based on the three-dimensional shape of the CG model 160 and the hand 150 stored in the model shape storage unit 1040, and the position and orientation of viewpoints of the image capturing devices 100 and 110 obtained from the position and orientation estimation unit 1070. The image generation unit 1050 compares the anteroposterior relation between the CG model 160 and the hand 150 in drawing pixels to determine whether the CG model 160 is to be drawn. More specifically, when the image generation unit 1050 determines that the hand 150 is anterior to the CG model 160, the image generation unit 1050 does not draw the CG model 160 to the relevant pixels. Then, an image combination unit 1060 processes the image of the CG model 160 so that the hand 150 of the captured real image is shown.

The image combination unit 1060 overwrites the images of the three-dimensional shape of the CG model (virtual object) 160 generated by the image generation unit 1050 onto respective images of the image capturing devices 100 and 110 stored in the image storage unit 1010 to combine the images. The image combination unit 1060 outputs the generated combined image to the display unit 208 to visually present the anteroposterior relation between the CG model 160 and the hand 150 to the subject.

The image storage unit 1010 outputs to the image combination unit 1060 the captured real image used in processing of the shape estimation unit 1020, the position and orientation estimation unit 1070, and the image generation unit 1050. This processing is to allow the image combination unit 1060 to combine the image of the three-dimensional shape generated by the image generation unit 1050 with the image stored in the image storage unit 1010 in a synchronized state. It is desirable to complete all processing performed by the shape estimation unit 1020, the position and orientation estimation unit 1070, and the image generation unit 1050, within an interval of image transmission from the above-described image acquisition unit 1000 (within 1/30 seconds in the present exemplary embodiment), to allow the image combination unit 1060 to handle synchronized images.

Figure 2:
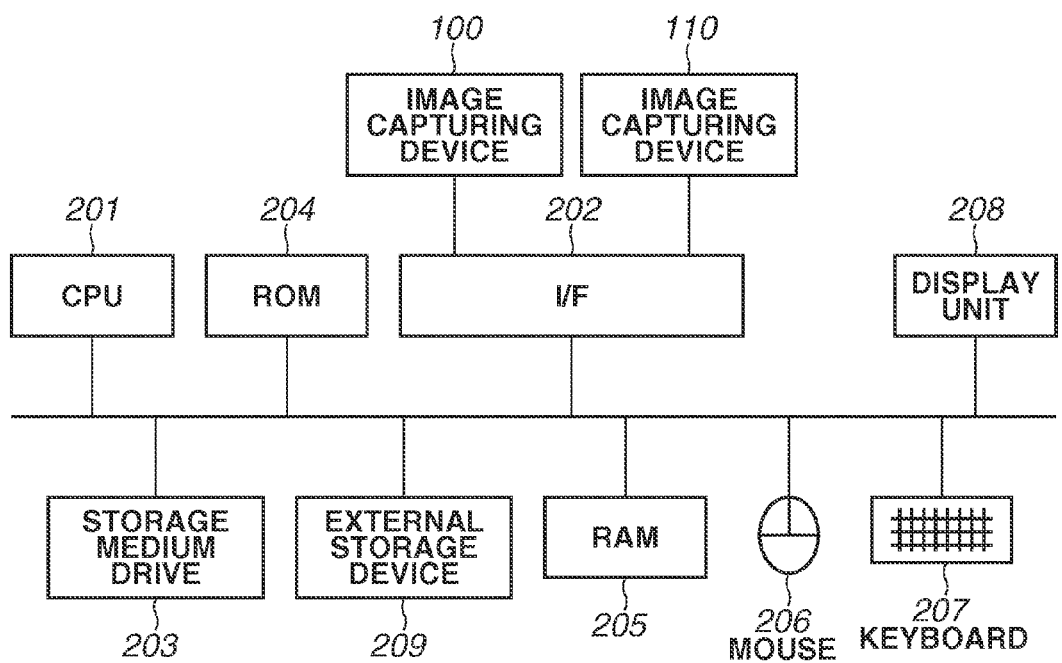
FIG. 2 is a block diagram illustrating a hardware configuration of a real-time three-dimensional shape estimation apparatus according to the first exemplary embodiment.

FIG. 2 is a schematic diagram illustrating a hardware configuration for implementing the information processing apparatus according to the present exemplary embodiment.

A central processing unit (CPU) 201 controls the entire computer by using computer programs and data stored in a RAM 205 and a read only memory (ROM) 204. The CPU 201 also executes each processing to be performed by the information processing apparatus, as described below in the following exemplary embodiments.

The RAM 205 temporarily stores a computer program and data loaded from an external storage device 209 and a storage medium drive 203. The RAM 205 includes an area for temporarily storing data received from the outside via an interface (I/F) 202. The RAM 205 further includes a work area used by the CPU 201 to execute each processing. More specifically, the RAM 205 can suitably provide various types of areas.

The ROM 204 stores setting data and a boot program of the computer.

A keyboard 207 and a mouse 206 are example operation input devices which are operated by a computer user for inputting various instructions to the CPU 201.

A display unit 208, including a cathode ray tube (CRT) and a liquid crystal display (LCD), displays a processing result of the CPU 201 by using images and texts. More specifically, a combined image generated by combining a real space image captured by the image capturing devices 100 and 110 with a virtual image can be displayed on the display unit 208.

The external storage device 209 is a mass storage device represented by a hard disk drive apparatus. The external storage device 209 stores an operating system (OS), and programs and data for causing the CPU 201 to execute each processing to be performed by the information processing apparatus. Referring to FIG. 1, computer programs related to the information processing apparatus include functions corresponding to the image acquisition unit 1000, the object shape estimation unit 1020, the image generation unit 1050, the position and orientation estimation unit 1070, and the image combination unit 1060. Computer programs and data stored in the external storage device 209 are suitably loaded into the RAM 205 under the control of the CPU 201. The CPU 201 executes processing by using the loaded programs and data to implement each processing performed by the information processing apparatus. The external storage device 209 may be served as the model shape storage unit 1040 and the image storage unit 1010 illustrated in FIG. 1.

The storage medium drive 203 reads programs and data recorded on a storage medium, such as a compact disc read only memory (CD-ROM) and a digital versatile disc read only memory (DVD-ROM), and stores computer programs and data in the relevant storage medium. A part or whole of the programs and data described to be stored in the external storage device 209 may be recorded in these storage media. Computer programs and data read from a storage medium by the storage medium drive 203 are output to the external storage device 209 and the RAM 205.

The I/F 202 includes an analog video port for connecting the image capturing devices 100 and 110, or a digital input/output port, such as IEEE1394. Data received via the I/F 202 is input to the RAM 205 and the external storage device 209. A part of functions of the image acquisition unit 1000 illustrated in FIG. 1 is implemented by the I/F 202.

A bus 210 interconnects the above-described components via bus signals.

(Flowchart)

Figure 3:
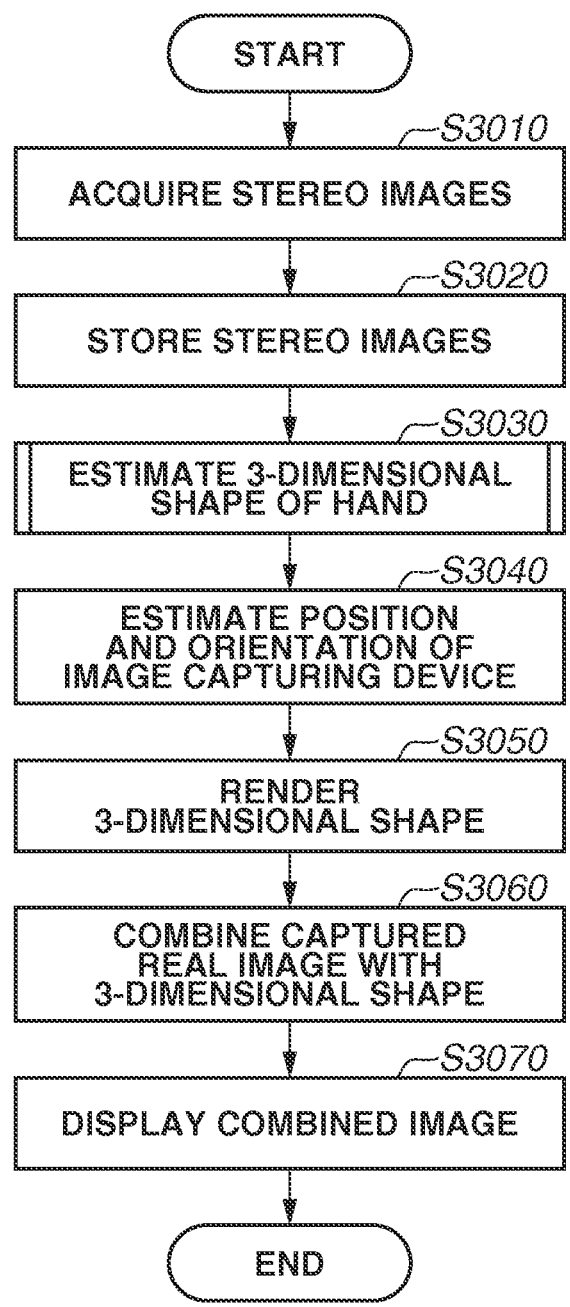
FIG. 3 is a flowchart illustrating processing performed by the real-time three-dimensional shape estimation apparatus according to the first exemplary embodiment.

Processing and procedures for a position and orientation measurement method according to the present exemplary embodiment will be described below. FIG. 3 is a flowchart illustrating processing and procedures according to the present exemplary embodiment.

In step S3010, the image acquisition unit 1000 obtains stereo images from the image capturing devices 100 and 110.

In step S3020, the image storage unit 1010 temporarily stores the stereo images obtained from the image acquisition unit 1000 in a memory.

In step S3030, the object shape estimation unit 1020 extracts the region of the hand 150 appearing in the stereo images stored in the image storage unit 1010, and estimates a three-dimensional shape of the hand 150. This step will be described in detail below.

In step S3040, the position and orientation estimation unit 1070 measures a position and orientation of at least either one of the image capturing devices 100 and 110. The estimated position and orientation is used for rendering of the CG model 160 by the image generation unit 1050.

In step S3050, the image generation unit 1050 obtains the three-dimensional shape of the hand 150 and the shape of the CG model 160 stored in the model shape storage unit 1040, and the position and orientation of the image capturing devices 100 and 110 measured by the position and orientation estimation unit 1070. Then, the image generation unit 1050 draws an image of the CG model 160 viewed from the position and orientation of the image capturing devices 100 and 110. When drawing, the image generation unit 1050 determines a distance of the hand 150 and the CG model 160 from the image capturing devices 100 and 110 for each drawing pixel. For a pixel on the posterior side of the hand 150, the image generation unit 1050 does not draw the CG model 160 so that the pixel is in a transparent state. More specifically, the image combination unit 1060 displays the captured real image on the anterior side so that the subject is presented the image of the hand 150.

In step S3060, the image combination unit 1060 overwrites the image of the CG model 160 generated in step S3050 onto the captured real image recorded in step S3020 to combine the images.

In step S3070, the display unit 208 outputs the combined image generated in step S3060 to the display.

Figure 4:
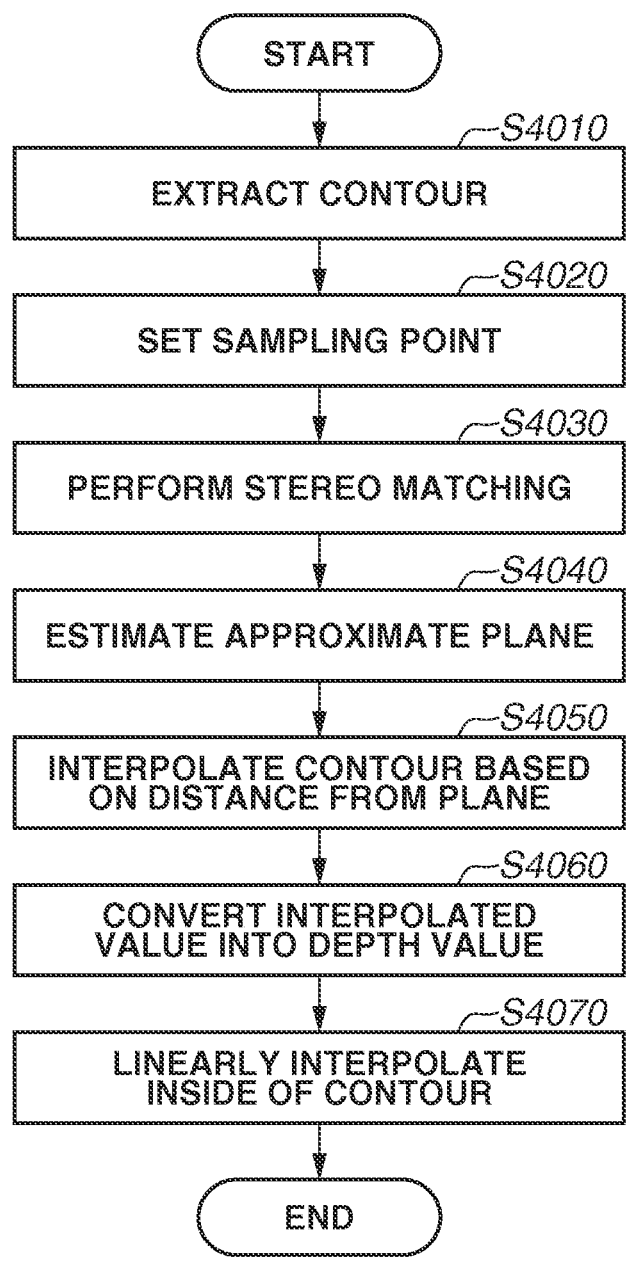
FIG. 4 is a flowchart illustrating processing for estimating a three-dimensional shape of a hand performed by the real-time three-dimensional shape estimation apparatus according to the first exemplary embodiment.

The following describes detailed processing for estimating the three-dimensional shape of the hand 150 in step S3030 with reference to the flowchart illustrated in FIG. 4.

In step S4010, the object shape estimation unit 1020 extracts the contour of the hand 150 as a target object for each of the images of the image capturing devices 100 and 110 recorded in the image storage unit 1010. The contour is typically a line or curve, corresponding to a detected edge for example.

In the present exemplary embodiment, for example, the object shape estimation unit 1020 extracts a difference between a preobtained background image and the current captured real image to extract the region of the hand 150 as the foreground, as discussed in "Hayashi K, Kato H, and Nishida S, Depth Determination of Real Objects using Contour Based Stereo Matching. Journal of the Virtual Reality Society of Japan. 2005; 10(3): 371-380". Image coordinates (X, Y) of a contour portion from the region of the extracted hand 150 are stored as a contour-coordinates list in the RAM 205.

According to the present exemplary embodiment, extracting of a contour is not limited to the method based on a difference from a background image, as discussed in "Hayashi K, Kato H, and Nishida S, Depth Determination of Real Objects using Contour Based Stereo Matching. Journal of the Virtual Reality Society of Japan. 2005; 10 (3): 371-380". Alternatively, for example, a target object region may be detected based on pixel color information to obtain a contour. More specifically, in the case of the hand 150, hand's skin color information is preregistered, and a color region matching with the skin color information from the captured real image is detected as a target object region.

In step S4020, the object shape estimation unit 1020 divides the contour at equal intervals to the contour-coordinates list calculated in step S4010. Further, for each of line segments of the divided contour, the object shape estimation unit 1020 sets (selects) an image coordinate value having the largest curvature as a sampling point. The object shape estimation unit 1020 performs processing of the sampling point on each of images of the image capturing devices 100 and 110.

There is a case where, if a region having a large curvature, such as a fingertip, becomes a dividing point when the contour is divided at equal intervals, the fingertip portion may not be detected as a sampling point. This situation is the situation indicated by the above-described condition 2 where corresponding points do not exist in a region having a large curvature.

In the present exemplary embodiment, the contour is divided at equal intervals and the image coordinate value having the largest curvature is set as a sampling point. However, the processing is not limited thereto. Other sampling methods, which reduce the burden in processing for obtaining depth values of a contour, are also applicable. Examples of the sampling method include a method in which horizontal lines are arranged for dividing an image in an on-screen perpendicular direction at predetermined intervals and an intersection with the contour is set as a sampling point.

In step S4030, the object shape estimation unit 1020 associates the sampling points in the right and left images, which are calculated in step S4020, between images through the stereo matching processing. In this stereo matching processing, for example, the matching processing discussed in "Hayashi K, Kato H, and Nishida S, Depth Determination of Real Objects using Contour Based Stereo Matching. Journal of the Virtual Reality Society of Japan. 2005; 10(3): 371-380" can be used. Specifically, to associate the sampling point in the image for the left eye with the sampling point in the image for the right eye, an epipolar line (scanning line) on the right eye is drawn, and the sampling points on the contour in a vicinity of the epipolar line are set as corresponding points.

In the present exemplary embodiment, the stereo matching processing is not limited to the method using an epipolar line. Other methods for obtaining the corresponding points, for example, a method in which image correlation is searched for in a peripheral region of the sampling point are also applicable.

Figure 7:
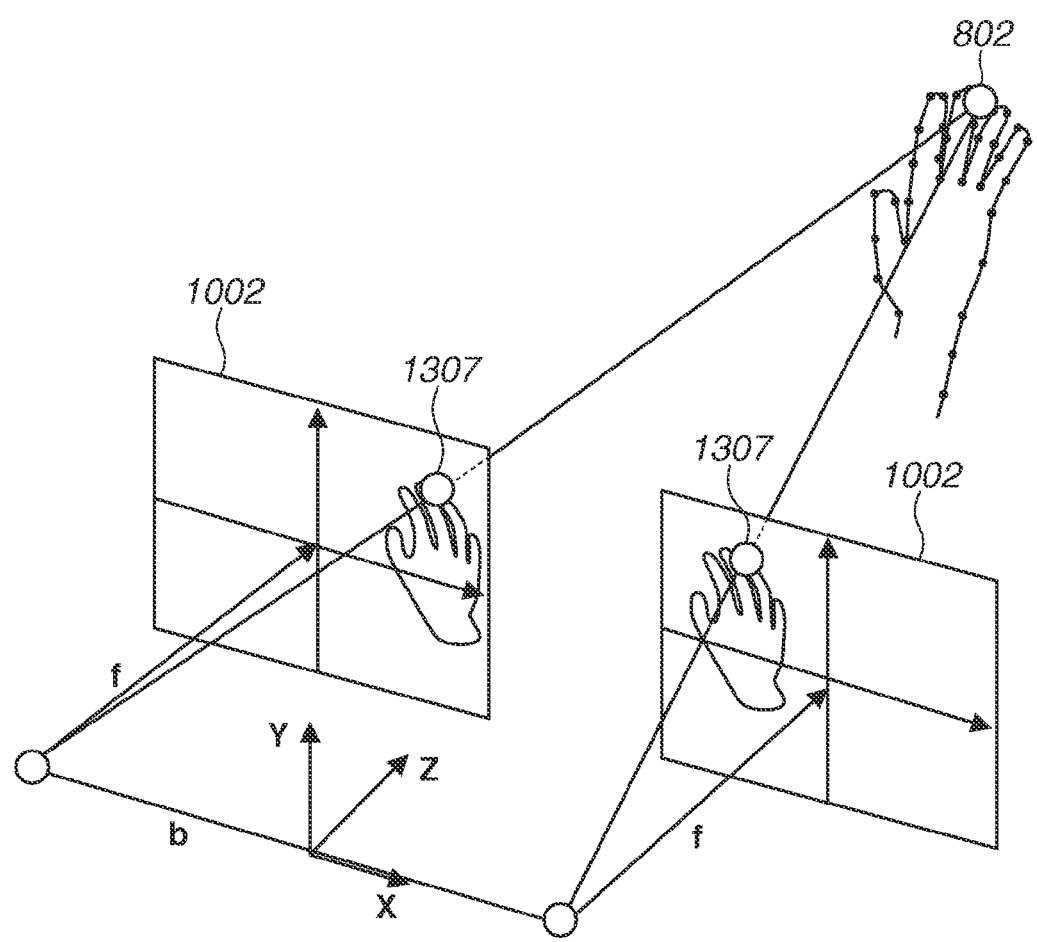
FIG. 7 is a schematic diagram illustrating a method for calculating a three-dimensional position on a contour of the hand according to the first exemplary embodiment.
Figure 8:
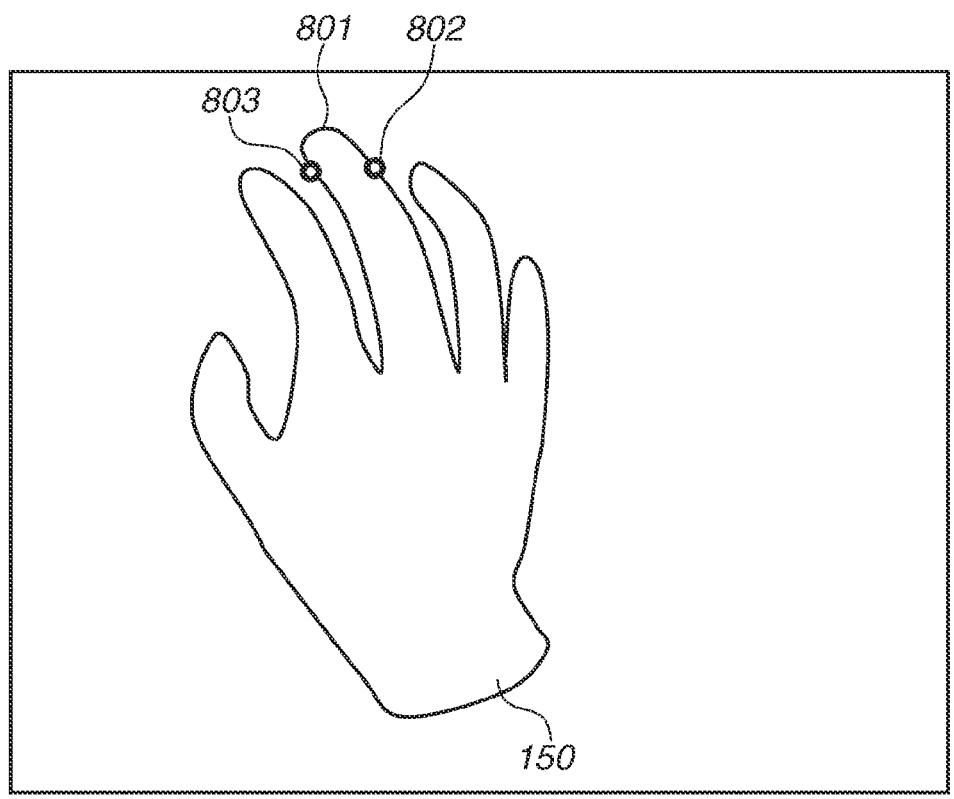
FIG. 8 is a schematic diagram illustrating a conventional issue.
Figure 9:
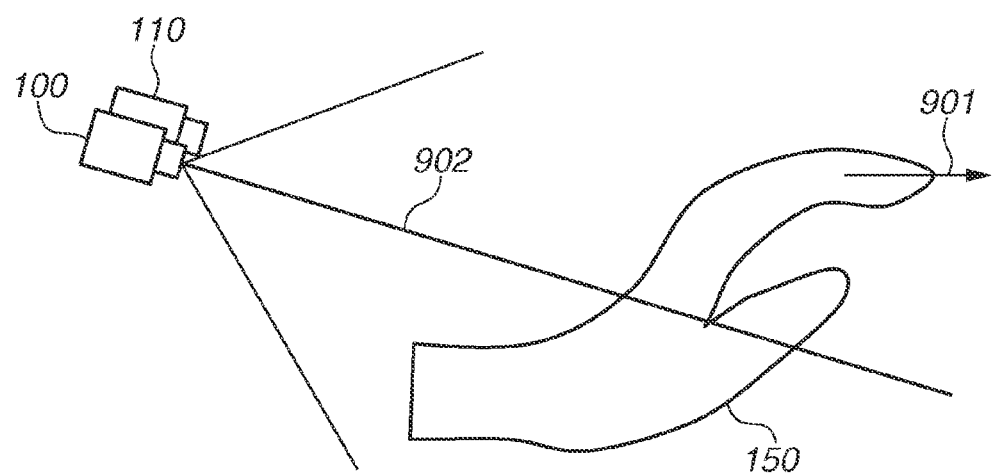
FIG. 9 is a schematic diagram illustrating the conventional issue.
Figure 10:
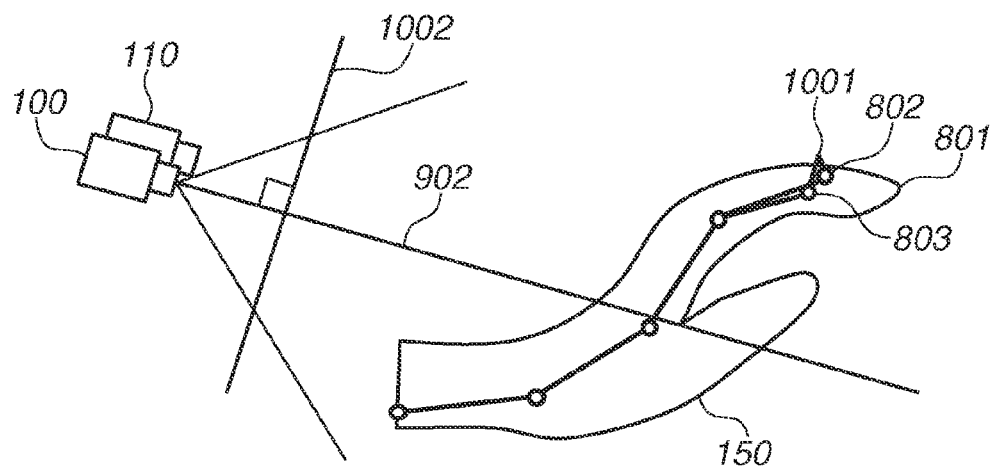
FIG. 10 is a schematic diagram illustrating a depth value error occurring with the conventional technique.

Based on correspondence information of the obtained corresponding points, the relative position and orientation of the right and left cameras (the image capturing devices 100 and 110) of the stereo camera, and camera internal parameters (lens distortion and fluoroscopic projection conversion information), the object shape estimation unit 1020 determines a depth value of the corresponding points through triangulation (see FIG. 7). The object shape estimation unit 1020 calculates the depth value of all corresponding points and stores, in the RAM 205, the three-dimensional position (X, Y, Z) of the corresponding point 802 in the image capturing devices 100 and 110 as a corresponding-points list.

In step S4040, based on the three-dimensional positions of the corresponding points stored in the corresponding-points list, the object shape estimation unit 1020 derives a plane for approximating the three-dimensional shape of the contour of the hand 150 (approximate plane derivation).

Figure 11:
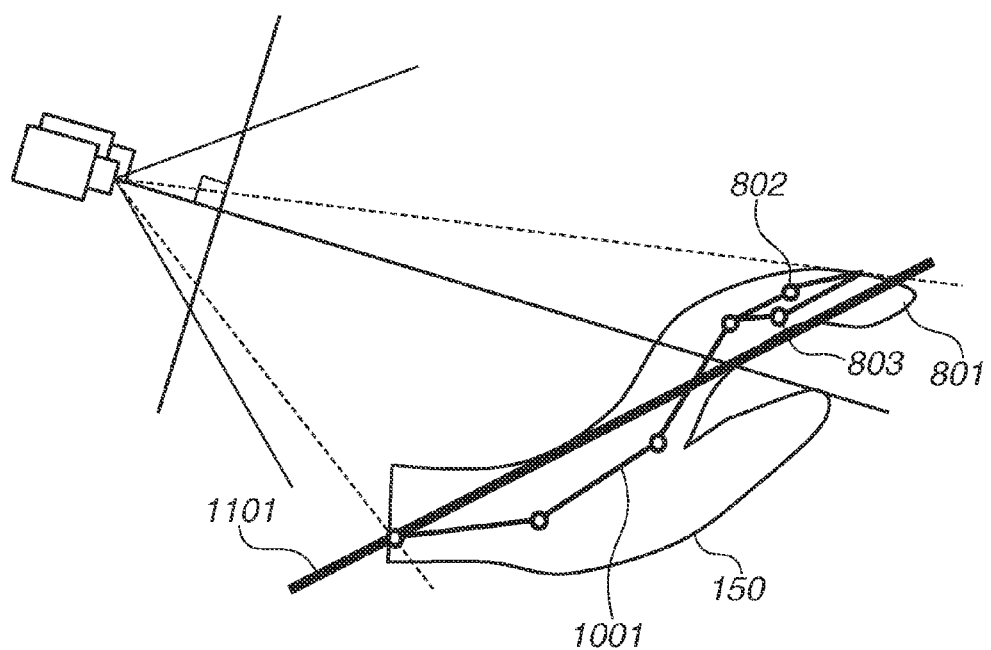
FIG. 11 is a schematic diagram illustrating an approximate plane according to the first exemplary embodiment.
Figure 12:
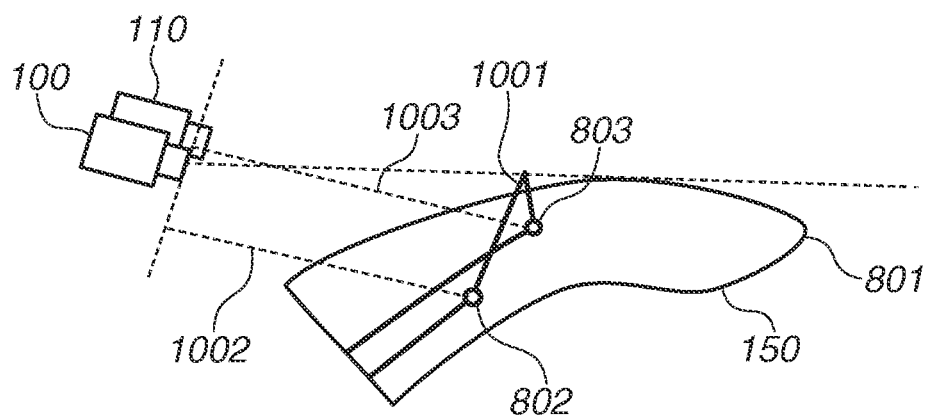
FIG. 12 is a schematic diagram illustrating a depth value error occurring with the conventional technique.
Figure 13:
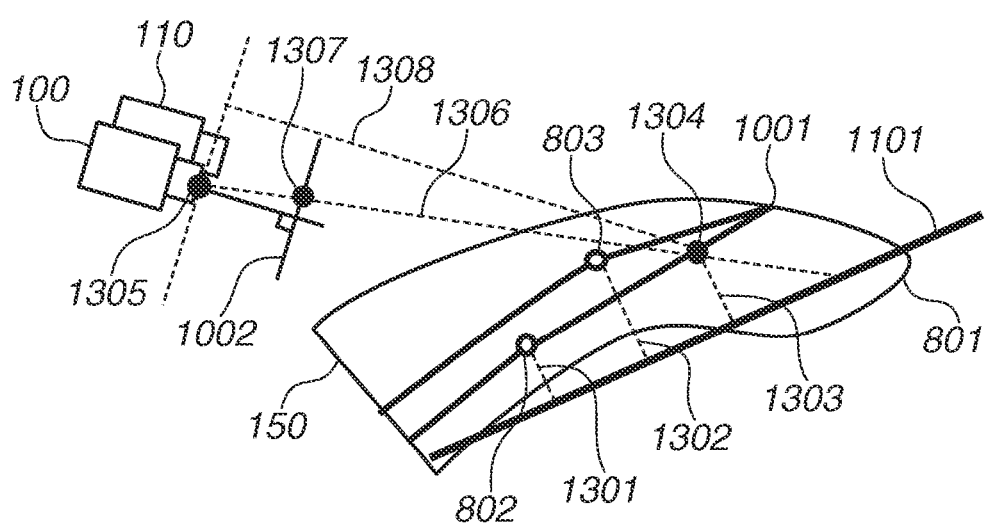
FIG. 13 is a schematic diagram illustrating an approximate plane according to the first exemplary embodiment.

FIG. 11 a schematic diagram illustrating a relation between the three-dimensional position of the corresponding point 802 on the contour and an approximate plane 1101. FIG. 13 is a schematic diagram illustrating the fingertip 801 illustrated in FIG. 11 in an enlarged view.

To derive the approximate plane 1101 for approximating the three-dimensional shape of a contour 1001, the least squares approximation formula is used for obtaining plane parameters with which a distance from the three-dimensional position (three-dimensional coordinates) stored in the corresponding-points list to the approximate plane 1101 (for example, distances 1301 and 1302 illustrated in FIG. 13) is minimized. The plane parameters indicate normal line vectors of a, b, and c, and a constant d in a plane formula: ax+by+cz+d=0.

Although, in the present exemplary embodiment, the least squares approximation method is used to derive the adjacent approximate plane 1101, it is not limited thereto. Other methods for calculating a plane close to the three-dimensional shape of the contour are also applicable.

In step S4050, the object shape estimation unit 1020 calculates the depth value of the contour-coordinates list by using the depth values of the corresponding points on the contour. If linear interpolation is performed on the depth values of the contour based on depth values 1002 and 1003 at the corresponding points 802 and 803 at both ends, an error will arise in a region having a large curvature out of the portions of contour, as described above in the issue.

To solve the issue, instead of performing linear interpolation on the depth values 1002 and 1003 at both ends, the object shape estimation unit 1020 interpolates the distances 1301 and 1302 between the approximate plane 1101 for approximating the three-dimensional shape of the contour obtained in step S4040 and the corresponding points 802 and 803, respectively, and converts the interpolated values (distances) into depth values.

The object shape estimation unit 1020 obtains the distance from the approximate plane 1101 to the corresponding points 802 and 803 at both ends. The distance from a point $(x_0, y_0, z_0)$ to a plane: ax+by+cz+d=0 is calculated by the following expression:

$$\frac{|ax_0 + by_0 + cz_0 + d|}{\sqrt{a^2 + b^2 + c^2}}. \quad (1)$$

More specifically, the object shape estimation unit 1020 obtains the distance 1301 between the corresponding point 802 and the approximate plane 1101, and the distance 1302 between the corresponding point 803 and the approximate plane 1101, by using Expression 1. The object shape estimation unit 1020 associates the obtained distances 1301 and 1302 at the corresponding points at both ends with the coordinate values of the contour-coordinates list enclosed by the corresponding points at both ends, and performs linear interpolation on the values of the distances 1301 and 1302. As described above, a distance 1303 from the point 1304 on the contour 1001 and the approximate plane 1101 can be obtained by performing linear interpolation using the distances 1301 and 1302 between the approximate plane 1101 and the corresponding points 802 and 803. The obtained distance 1303 is denoted by a distance k.

In step S4060, the object shape estimation unit 1020 converts the distances 1301 and 1302 from the approximate plane 1101, which is linearly interpolated in step S4050, into depth values.

Since the distances 1301 and 1302 from the approximate plane 1101 cannot be directly used to obtain depth values of the target object, the object shape estimation unit 1020 converts the distances 1301 and 1302 into depth values of a coordinate system (hereinafter referred to as an imaging coordinate system) with reference to the image capturing devices 100 and 110. The following describes processing for converting the distance 1303 from the approximate plane 1101 into a depth value of the imaging coordinate system, focusing on the point 1304 on the contour 1001 illustrated in FIG. 13.

1. Obtain a straight line 1306 (denoted by L) which passes through a viewpoint position 1305 (denoted by O) and image coordinates 1307 (denoted by $P_0$) of the contour on a projection surface 1002 of the image capturing device 100. The coordinate values of $P_0$ are $(v_x, v_y, -1)$.

2. Obtain a plane K which is parallel to the approximate plane 1101, and distant therefrom by the distance 1303 (denoted by the distance k) calculated after interpolation processing. The plane K can expressed as ax+by+cz+d+k=0.

3. When a normal line N of the plane K and the straight line L form an angle α, a vector $OP_0$ (denoted by a vector j) and the normal line N (denoted by a vector n) can be expressed as follows:

$$\cos \alpha = \frac{\vec{n} \cdot \vec{j}}{|\vec{j}|} \quad (2)$$

where the magnitude of the normal line N is 1.

4. The intersection of the straight line L and the plane K is the target point 1304 (denoted by P). To obtain the point P, a perpendicular is taken down from the viewpoint O to the plane K, and the intersection of the perpendicular and the plane K is denoted by a point A. The normal line N of the plane K and the straight line L form the angle α. Since a triangle OAP is a right triangle, the triangle OAP can be expressed as follows:

$$|\vec{OP}| = \frac{|\vec{OA}|}{\cos \alpha}. \quad (3)$$

Since a distance OA can be expressed as d+k based on a plane formula: ax+by+cz+d+k=0, Equation 3 can be expressed as follows:

$$|\vec{OP}| = \frac{d+k}{\cos \alpha}. \quad (4)$$

Further, a straight line OP can be expressed as follows:

$$\vec{OP} = \frac{|\vec{OP}|}{|\vec{OP_0}|} |\vec{OP_0}| = \frac{(d+k)/\cos \alpha}{|\vec{j}|} \begin{pmatrix} v_x \\ v_y \\ -1 \end{pmatrix} = \frac{(d+k)}{|\vec{j}|\cos \alpha} \begin{pmatrix} v_x \\ v_y \\ -1 \end{pmatrix}. \quad (5)$$

When Equation 2 is substituted to Equation 5, the following expression can be obtained:

$$\frac{(d+k)}{\vec{n}\cdot\vec{j}}\begin{pmatrix}v_x\\v_y\\-1\end{pmatrix}. \quad (6)$$

More specifically, when the distance 1303 from the approximate plane 1101 (an interpolated value of the point 1304 on the contour 1001) is converted into depth values of the imaging coordinate system, the result can be expressed as follows:

$$-\frac{(d+k)}{\vec{n}\cdot\vec{j}}. \quad (7)$$

In step S4070, the object shape estimation unit 1020 interpolates the depth values inside the contour of the hand 150 as the target object by using the depth values on the contour obtained in step S4060. Similar to the interpolation method discussed in "Hayashi K, Kato H, and Nishida S, Depth Determination of Real Objects using Contour Based Stereo Matching. Journal of the Virtual Reality Society of Japan. 2005; 10(3): 371-380", horizontal linear interpolation is preformed on depth values of contour at both ends of the region.

According to the above-described processing, even in a case where a region of the contour of the target object having a large curvature extends in the depth direction of the camera, and where there are no corresponding points having depth values in the vicinity of the relevant region, depth values can be accurately estimated by interpolating the distance between the target object and the approximate plane 1101.

In the first exemplary embodiment, when interpolating the contour in step S4050, linear interpolation is performed on the entire contour between corresponding points based on the distance and the approximate plane 1101.

Figure 14:
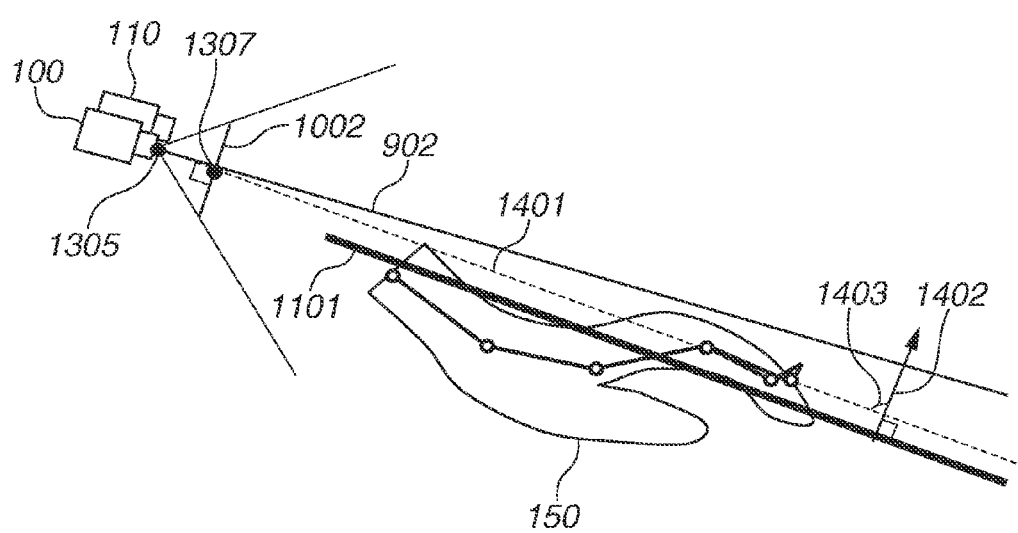
FIG. 14 is a schematic diagram illustrating an issue according to the first exemplary embodiment.

However, as illustrated in FIG. 14, when a straight line 1401 passing through the image coordinates 1307 (coordinates on the captured image) of the contour on the projection surface from the viewpoint position 1305 of the image capturing device 100 and a normal line 1402 of the approximate plane 1101 forms an angle 1403 of 90 degrees, the approximate plane 1101 and the straight line 1401 do not intersect with each other. That is, since there is no intersection, the distance subjected to interpolation cannot be calculated.

When the angle 1403 formed by the straight line 1401 and the normal line 1402 is close to 90 degrees, an intersection exists at a position close to infinity from the fingertip of the hand 150. In this case, distance linear interpolation produces a larger error than depth-value linear interpolation.

In a second exemplary embodiment, the object shape estimation unit 1020 checks the angle 1403 formed by the straight line 1401 and the normal line 1402 for each image coordinates subjected to interpolation (angle calculation). When the angle 1403 is close to 90 degrees, the object shape estimation unit 1020 switches the processing to the depth-value linear interpolation.

In the second exemplary embodiment, the configuration of the information processing apparatus according to the first exemplary embodiment remains unchanged. A part of processing to be performed by the object shape estimation unit 1020 is changed.

(Flowchart)

Processing by the object shape estimation unit 1020 according to the present exemplary embodiment will be described below with reference to the flowchart illustrated in FIG. 5. In the flowchart illustrated in FIG. 5, steps executing the same processing as those in the first exemplary embodiment are assigned an identical step number, and redundant descriptions thereof will be omitted.

Figure 5:
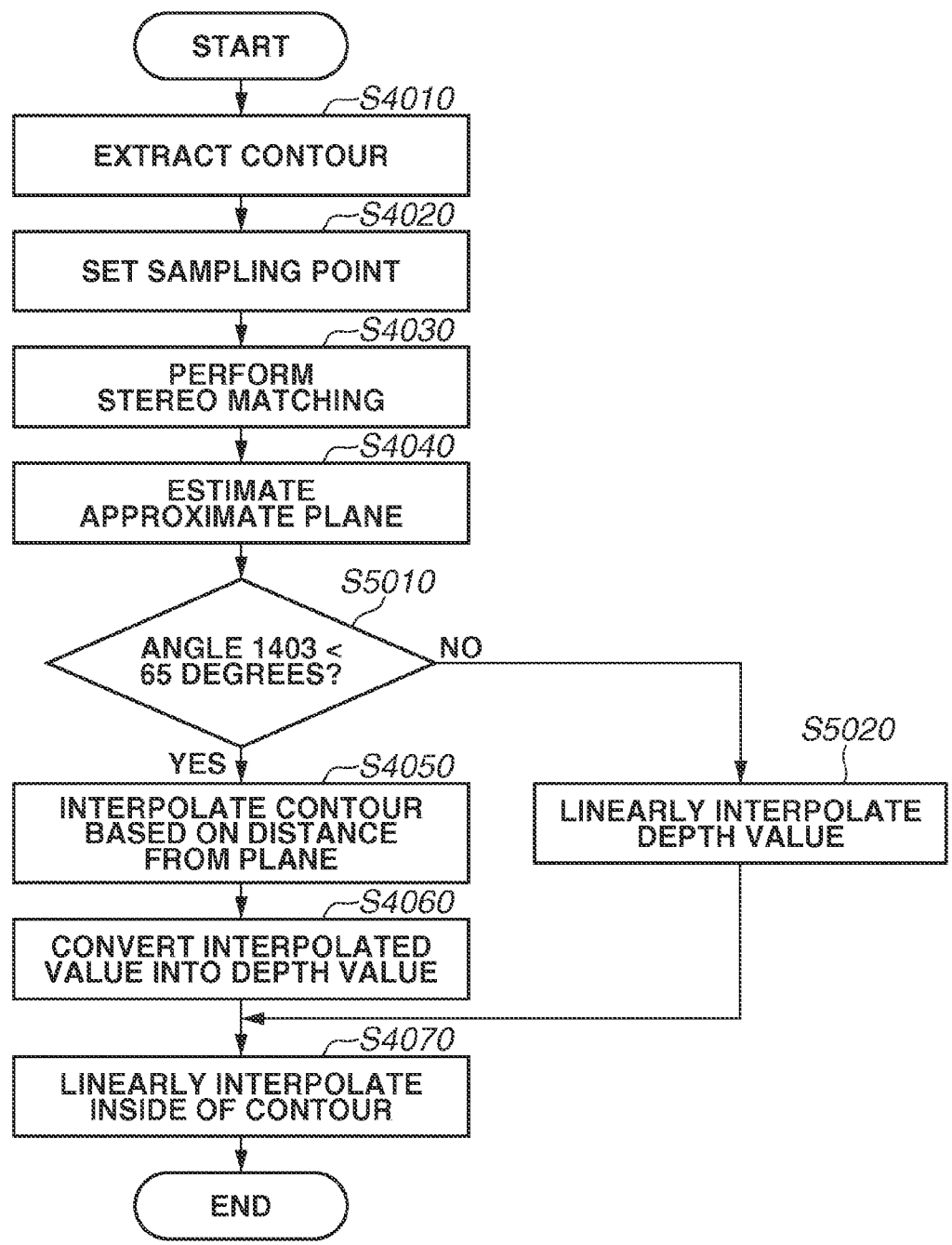
FIG. 5 is a flowchart illustrating processing for estimating a three-dimensional shape of the hand performed by the real-time three-dimensional shape estimation apparatus according to the first exemplary embodiment.

In the flowchart illustrated in FIG. 5, steps S5010 and S5020 are added to the flowchart according to the first exemplary embodiment.

In step S5010, for the image coordinates 1307 of the contour subjected to interpolation, the object shape estimation unit 1020 calculates the angle 1403 formed by the straight line 1401 passing through the image coordinates 1307 from the viewpoint position 1305 of the image capturing device 100 and the normal line 1402 of the approximate plane 1101. The object shape estimation unit 1020 further determines whether the angle 1403 is smaller than 65 degrees. In the present exemplary embodiment, the angle for the determination is set to 65 degrees. However, it can be changed within a range where the intersection of the straight line 1401 and the approximate plane 1101 does not become close to infinity.

The object shape estimation unit 1020 checks whether the angle 1403 is smaller than 65 degrees for the all contour-coordinates list subjected to interpolation. When the angle 1403 is determined to be equal to or greater than 65 degrees (NO in step S5010), then in step S5020, the object shape estimation unit 1020 performs linear interpolation based on the depth values. On the other hand, when the angle 1403 is determined to be smaller than 65 degrees (YES in step S5010), then in step S4050, the object shape estimation unit 1020 performs linear interpolation on the distance to the approximate plane 1101.

In step S5020, the object shape estimation unit 1020 obtains the depth values of the corresponding points at both ends, and performs linear interpolation based on the distances to the corresponding points at both ends. The object shape estimation unit 1020 outputs the depth values resulted from linear interpolation in association with the coordinate values of the contour-coordinates list.

As described above, according to the present exemplary embodiment, the interpolation method is switched according to the angle 1403 formed by the straight line 1401 and the normal line 1402 of the approximate plane 1101, whereby estimating of depth values can be accurately performed even in a case where the approximate plane 1101 and the straight line 1401 do not intersect with each other.

In the second exemplary embodiment, the object shape estimation unit 1020 determines which of distance linear interpolation and depth-value linear interpolation is to be performed for one threshold value. In a modification example, two different threshold values are provided. When the angle 1403 is determined to be between the two threshold values, the object shape estimation unit 1020 performs linear interpolation on calculated values by using either of two different interpolation methods depending on the angle 1403.

When the angle 1403 is between the two threshold values, the gap between depth values arising from the difference of the interpolation method (difference in the angle formed by the approximate plane) for adjacent image coordinates can be reduced by performing linear interpolation on each depth value by using angle parameters. Specifically, the present modification example aims at maintaining the smoothness of the entire contour.

In the present modification example, the configuration of the information processing apparatus described in the first and the second exemplary embodiments remains unchanged. A part of processing to be performed by the object shape estimation unit 1020 is changed.

(Flowchart)

Processing by the object shape estimation unit 1020 according to the present modification example will be described below with reference to the flowchart illustrated in FIG. 6. In the flowchart illustrated in FIG. 6, steps executing the same processing as those in the first and the second exemplary embodiments are assigned an identical step number, and redundant descriptions thereof will be omitted.

Figure 6:
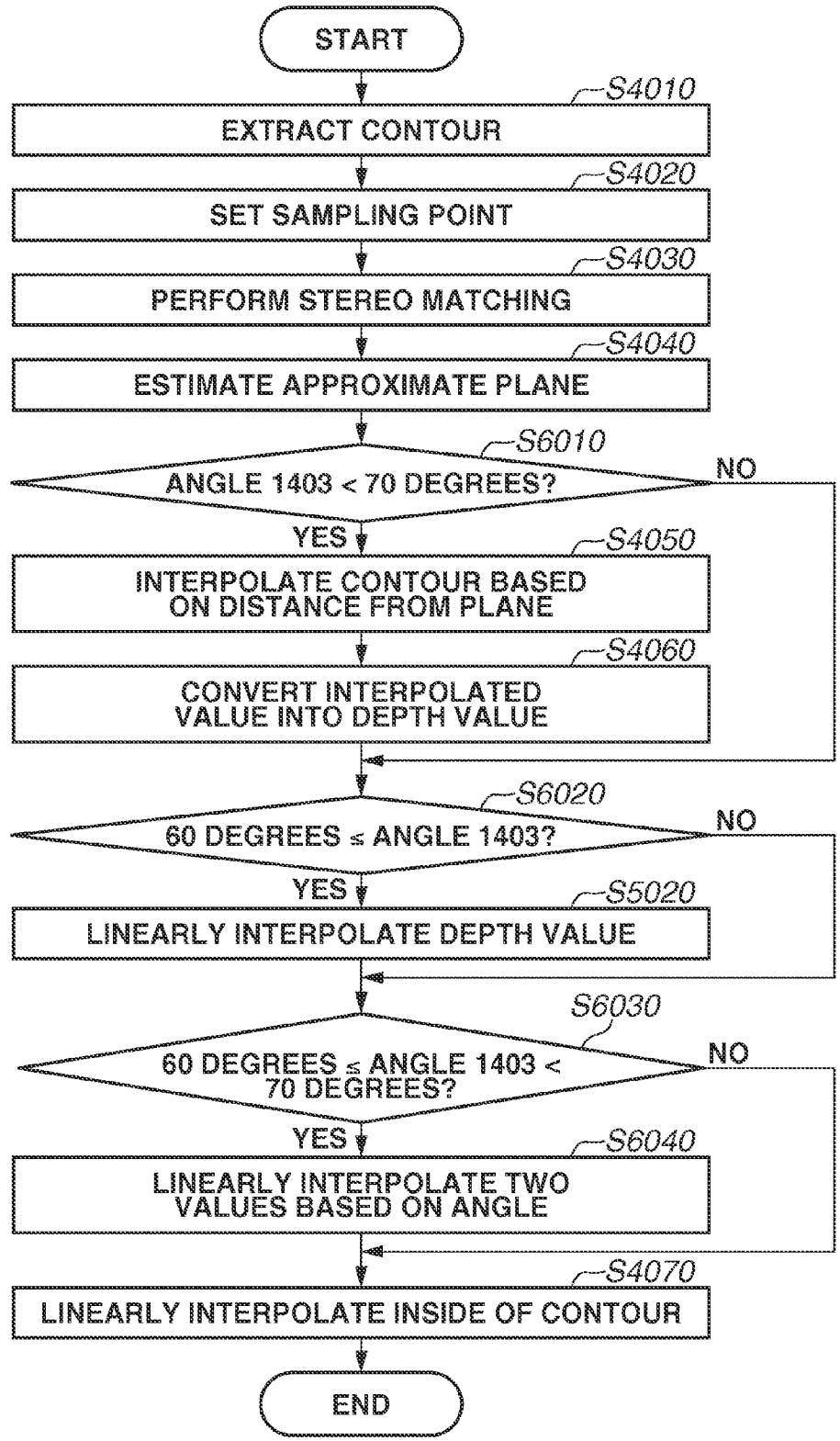
FIG. 6 is a flowchart illustrating processing for estimating a three-dimensional shape of the hand performed by the real-time three-dimensional shape estimation apparatus according to a second exemplary embodiment.

In the flowchart illustrated in FIG. 6, steps S6010 to S6040 are added to the flowchart according to the second exemplary embodiment.

In step S6010, the object shape estimation unit 1020 calculates the angle 1403, and determines whether the angle 1403 is smaller than 70 degrees (first value). When the angle 1403 is determined to be smaller than 70 degrees (YES in step S6010), then in step S4050, the object shape estimation unit 1020 performs linear interpolation on the distance to the approximate plane. On the other hand, when the angle 1403 is determined to be equal to or greater than 70 degrees (NO in step S6010), the processing proceeds to step S6020.

In step S6020, the object shape estimation unit 1020 refers to the angle 1403 to determine whether the angle 1403 is equal to or greater than 60 degrees (second value). When the angle 1403 is determined to be equal to or greater than 60 degrees (YES in step S6020), then in step S5020, the object shape estimation unit 1020 performs linear interpolation on depth values. On the other hand, when the angle 1403 is determined to be smaller than 60 degrees (NO in step S6020), the processing proceeds to step S6030.

In step S6030, the object shape estimation unit 1020 determines whether the angle 1403 is equal to or greater than 60 degrees and smaller than 70 degrees. When the angle 1403 is determined to be equal to or greater than 60 degrees and smaller than 70 degrees, i.e., falling between the two threshold values, (YES in step S6030), the processing proceeds to step S6040. On the other hand, when the angle 1403 is determined to be smaller than 60 degrees, or equal to or greater than 70 degrees, i.e., not falling between the two threshold values, (NO in step S6030), the processing proceeds to step S4070.

In step S6040, the object shape estimation unit 1020 sets, as the depth value, the result of linear interpolation on the depth value (denoted by $D_1$) calculated based on the distance to the plane obtained in step S4060 and the depth value (denoted by $D_2$) by the linear interpolation obtained in step S5020, based on the value of the angle 1403. For example, when the value of the angle 1403 formed by the straight line 1401 and the normal line 1402 of the approximate plane 1101 is a in the image coordinates 1307 subjected to linear interpolation, a depth value can be calculated by the following expression:

$$D_1 \times \frac{70 - |\alpha|}{10} + D_2 \times \frac{|\alpha| - 60}{10}. \qquad (8)$$

As described above, in the present modification example, the gap between depth values arising in the vicinity of a threshold value when one threshold value is used can be reduced by switching between the two interpolation methods by using two different threshold values, and three-dimensional contour can be smoothed.

In the first exemplary embodiment, in approximate plane estimation in step S4040, the object shape estimation unit 1020 obtains an approximate plane by using all corresponding points on the contour obtained through stereo matching. In a third exemplary embodiment, on the other hand, a plurality of approximate planes is provided according to the shape of the target object.

Figure 15:
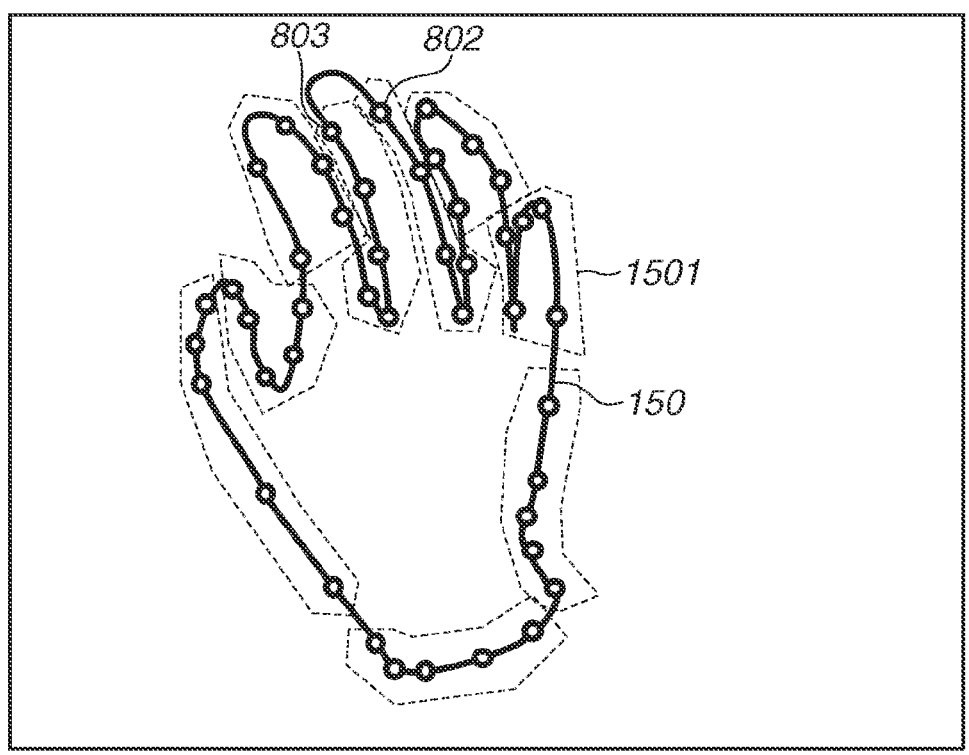
FIG. 15 is a schematic diagram illustrating grouping of corresponding points according to a third exemplary embodiment.
Figure 16:
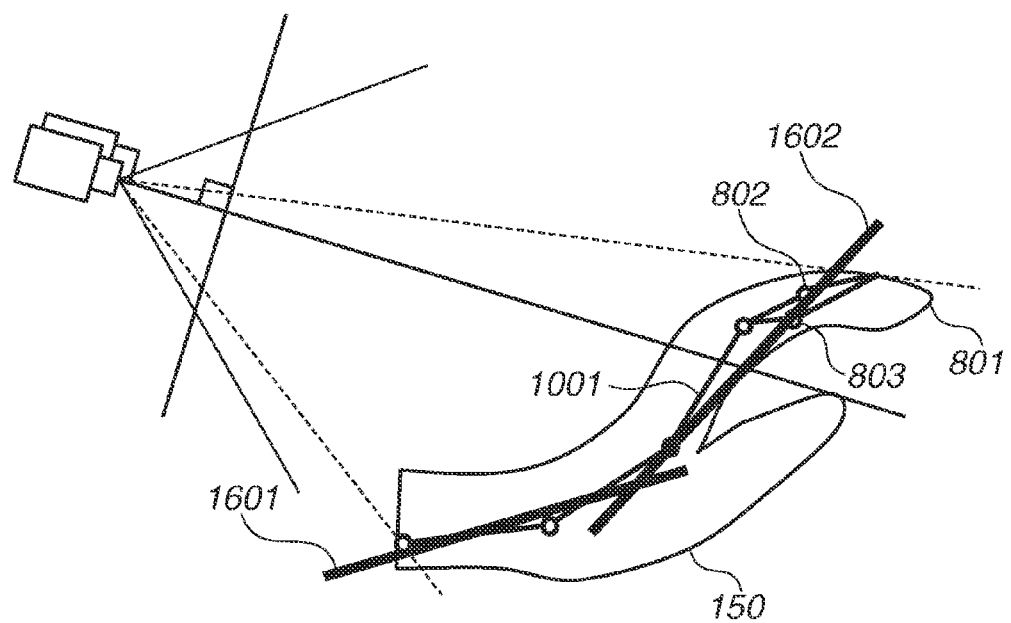
FIG. 16 is a schematic diagram illustrating a plurality of approximate planes according to the third exemplary embodiment.

In the present exemplary embodiment, the object shape estimation unit 1020 obtains corresponding points on the contour, and groups corresponding points in units of five adjacent corresponding points as illustrated in FIG. 15. Then, the object shape estimation unit 1020 obtains an approximate plane based only on the corresponding points belonging to each group (for example, corresponding points included in a dotted line 1501). The approximate plane is thus divided by grouping of the corresponding points on the contour. As a result, as illustrated in FIG. 16, distance linear interpolation is performed on approximate planes 1601 and 1602 providing a closer shape to the hand 150. Specifically, the above-described grouping method is effective in reducing an error in depth values obtained through linear interpolation on the distance to the approximate plane.

In the present exemplary embodiment, the configuration of the information processing apparatus according to the first exemplary embodiment remains unchanged. A part of processing to be performed by the object shape estimation unit 1020 is changed.

Processing by the object shape estimation unit 1020 according to the present exemplary embodiment can be implemented by changing the estimation processing for the approximate plane in step S4040, the interpolation processing in step S4050, and the conversion processing for distances into depth values in step S4060 as follows.

In step S4040, the object shape estimation unit 1020 groups five adjacent corresponding points among the corresponding points calculated in step S4030 as a group, and associates each group with relevant five corresponding points. Then, the object shape estimation unit 1020 calculates the approximate plane only from corresponding points belonging to one group. In the present invention, the number of corresponding points for one group is five, but it is not limited thereto. The number of corresponding points for one group may be changed according to the target shape and the acceptable calculation cost.

In step S4050, corresponding points of which the image coordinates on the contour subjected to interpolation are closest to each other are obtained, and the distance is calculated by using the approximate plane obtained for the group to which the corresponding points belong.

In step S4060, similar to step S4050, corresponding points of which the image coordinates on the contour subjected to interpolation are closest to each other are obtained, and the distance is converted into the depth value by using the approximate plane obtained for the group to which the corresponding points belong.

As described above, in the present exemplary embodiment, depth values can be accurately estimated by calculating a plurality of approximate planes for each contour.

In the above-described exemplary embodiments, all of the components of the information processing apparatus are configured by hardware. However, a part of these components may be configured by software. In this case, a computer performs operations of the position and orientation measuring apparatus described in the above-described exemplary embodiments by causing the computer implementing the remaining part by hardware to execute the software.

According to the present invention, depth values of an object can be accurately estimated.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-221091 filed Oct. 24, 2013, which is hereby incorporated by reference herein in its entirety.

What is claimed is:

1. An information processing apparatus comprising:
at least one processor configured to operate to:
from a first image of an object captured from a first viewpoint and from a second image of the object captured from a second viewpoint which is different from the first viewpoint, extract a contour of the object respectively;
associate a first plurality of points on a first contour extracted from the first image with a second plurality of points on a second contour, and derive three-dimensional coordinates of the associated points;
derive an approximate plane for approximating the object based on the derived three-dimensional coordinates of the associated points;
calculate an angle formed between a normal line of the approximate plane and a straight line connecting a viewpoint position of an image capturing device with a point on a contour; and
select, based on the calculated angle, either (i) processing to calculate distances between the associated points and the approximate plane, estimate depth values of one or more unassociated points other than the associated first plurality of points on the first contour based on the calculated distances and estimate depth values of one or more unassociated points other than the associated second plurality of points on the first contour based on the calculated distances or (ii) processing to estimate depth values of one or more unassociated points other than the associated first plurality of points on the first contour by performing linear interpolation on depth values of the associated points and estimate depth values of one or more unassociated points other than the associated second plurality of points on the second contour by performing linear interpolation on depth values of the associated points.

2. The information processing apparatus according to claim 1, the at least one processor further configured to operate to:
based on the depth values of the points on the contours derived, the depth values of the points estimated, and a depth value of a virtual object, combine the virtual object and the object.

3. The information processing apparatus according to claim 1, wherein depth values of unselected points are estimated by interpolating using the calculated distances and obtaining distances between the unassociated points and the approximate plane.

4. The information processing apparatus according to claim 1, the at least one processor further configured to operate to:
divide the extracted contour into line segments,
wherein a point belonging to a line segment having a largest curvature out of the line segments divided is selected.

5. The information processing apparatus according to claim 1, the at least one processor further configured to operate to:
set a scanning line on each of the first and second images,
wherein an intersection of the set scanning line and the contour is selected.

6. The information processing apparatus according to claim 5, wherein the scanning line is an epipolar line.

7. The information processing apparatus according to claim 1,
wherein, when the calculated angle is equal to or greater than a predetermined value, select the processing to estimate depth values of the unassociated points by performing linear interpolation on depth values of the associated points, and
wherein, when the angle is smaller than the predetermined value, select the processing to calculate distances between the associated points and the approximate plane and estimate depth values of one or more points not associated based on the calculated distances.

8. The information processing apparatus according to claim 1, the at least one processor is further configured to operate to:
group the associated points,
wherein an approximate plane for approximating the object for each of the groups is derived.

9. The information processing apparatus according to claim 1, wherein an image capturing device is mounted on a head-mounted display or a handheld display.

10. An information processing method comprising:
extracting, from a first image of an object captured from a first viewpoint and from a second image of the object captured from a second viewpoint which is different from the first viewpoint, a contour of the object respectively;
associating a first plurality of points on a first contour extracted from the first image with a second plurality of points on a second contour, and deriving three-dimensional coordinates of the associated points;
deriving a plane for approximating the object based on the derived three-dimensional coordinates of the associated points;

calculating an angle formed between a normal line of the approximate plane and a straight line connecting a viewpoint position of an image capturing device with a point on a contour; and selecting, based on the calculated angle, either (i) calculating distances between the associated points and the approximate plane, estimate depth values of one or more unassociated points other than the associated first plurality of points on the first contour based on the calculated distances and estimate depth values of one or more unassociated points other than the associated second plurality of points on the first contour based on the calculated distances or (ii) estimating depth values of one or more unassociated points other than the associated first plurality of points on the first contour by performing linear interpolation on depth values of the associated points and estimate depth values of one or more unassociated points other than the associated second plurality of points on the second contour by performing linear interpolation on depth values of the associated points.

11. A non-transitory storage medium storing a program for causing a computer to perform the information processing method according to claim 10.

12. A system comprising:
a display device; and
an information processing apparatus for generating a combined image to be displayed on the display device, wherein the display device comprises:
    an imaging unit configured to capture images of real space including an object from a plurality of viewpoints;
    a output unit configured to output each of the captured images to the information processing apparatus; and
    a display unit configured to obtain from the information processing apparatus a combined image formed by combining the captured real space image with a virtual image and display the obtained combined image,
wherein the information processing apparatus comprises at least on processor configured to operate to:

from a first image obtained from the output unit of the object captured from a first viewpoint and from a second image obtained from the output unit of the object captured from a second viewpoint, extract a contour of the object respectively;

associate a first plurality of points on a first contour extracted from the first image with a second plurality of points on a second contour, and derive three-dimensional coordinates of the associated points;

derive an approximate plane for approximating the object based on the derived three-dimensional coordinates of the associated points;

calculate an angle formed between a normal line of the approximate plane and a straight line connecting a viewpoint position of an image capturing device with a point on a contour; and select, based on the calculated angle, either (i) processing to calculate distances between the associated points and the approximate plane, estimate depth values of one or more unassociated points other than the associated first plurality of points on the first contour based on the calculated distances and estimate depth values of one or more unassociated points other than the associated second plurality of points on the first contour based on the calculated distances or (ii) processing to estimate depth values of one or more unassociated points other than the associated first plurality of points on the first contour by performing linear interpolation on depth values of the associated points and estimate depth values of one or more unassociated points other than the associated second plurality of points on the second contour by performing linear interpolation on depth values of the associated points;

combine the first image, the second image and the virtual image to form a combined image based on the depth values of the points on the estimated contour; and obtain, from the display unit, the real space images captured by the imaging unit, and output the combined image to the display unit.

* * * * *